United States Patent
Lucas

(10) Patent No.: US 10,550,283 B2
(45) Date of Patent: *Feb. 4, 2020

(54) POWDER COATING COMPOSITIONS CAPABLE OF HAVING A SUBSTANTIALLY NON-ZINC CONTAINING PRIMER

(71) Applicant: AKZO NOBEL COATINGS INTERNATIONAL B.V., Arnhem (NL)

(72) Inventor: Chad Lucas, Newburgh Heights, OH (US)

(73) Assignee: Akzo Nobel Coating International B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,093

(22) Filed: Jun. 7, 2018

(65) Prior Publication Data

US 2018/0282572 A1    Oct. 4, 2018

Related U.S. Application Data

(63) Continuation of application No. 13/387,431, filed as application No. PCT/EP2010/060907 on Jul. 27, 2010, now Pat. No. 10,011,736.

(60) Provisional application No. 61/229,565, filed on Jul. 29, 2009.

(30) Foreign Application Priority Data

Sep. 3, 2009 (EP) ..................................... 09169332

(51) Int. Cl.
| | |
|---|---|
| *C09D 163/00* | (2006.01) |
| *C09D 5/03* | (2006.01) |
| *C08G 59/62* | (2006.01) |
| *C09D 5/10* | (2006.01) |
| *C09D 7/62* | (2018.01) |
| *C09D 7/40* | (2018.01) |
| *C08K 3/34* | (2006.01) |
| *C08K 3/40* | (2006.01) |
| *C08L 63/00* | (2006.01) |
| *C08L 67/00* | (2006.01) |
| *C09D 163/02* | (2006.01) |
| *C09D 161/10* | (2006.01) |
| *C09D 167/00* | (2006.01) |
| *C09D 5/00* | (2006.01) |
| *C08K 3/04* | (2006.01) |
| *B32B 15/092* | (2006.01) |
| *C23C 26/00* | (2006.01) |

(52) U.S. Cl.
CPC .......... *C09D 163/00* (2013.01); *B32B 15/092* (2013.01); *C08G 59/621* (2013.01); *C09D 5/031* (2013.01); *C09D 5/038* (2013.01); *C09D 5/106* (2013.01); *C09D 7/62* (2018.01); *C09D 7/69* (2018.01); *C09D 7/70* (2018.01); *C08K 3/34* (2013.01); *C08K 3/40* (2013.01); *C08L 63/00* (2013.01); *C08L 67/00* (2013.01); *C08L 2205/02* (2013.01); *Y10T 428/31529* (2015.04)

(58) Field of Classification Search
CPC ............... C08L 63/00–10; C08L 67/00; C09D 163/00–10; C09D 5/03; C09D 5/031; C09D 7/70; C09D 167/00; C08K 3/34; C08K 3/40; C08G 59/621; B32B 15/092
See application file for complete search history.

(56) References Cited

U.S. PATENT DOCUMENTS

| | | |
|---|---|---|
| 3,170,890 A | 2/1965 | Boyd et al. |
| 3,245,925 A | 4/1966 | Watson |
| 3,336,251 A | 8/1967 | Manasia |
| 3,756,984 A | 9/1973 | Klaren et al. |
| 3,769,069 A | 10/1973 | Sawyer |
| 3,817,946 A | 6/1974 | Ree |
| 3,860,557 A | 1/1975 | Millar et al. |
| 3,874,883 A | 4/1975 | Robitaille et al. |
| 3,884,705 A | 5/1975 | Blair |
| 3,947,522 A | 3/1976 | Shelley, Jr. et al. |
| 4,186,036 A | 1/1980 | Elms et al. |
| 4,237,037 A | 12/1980 | Takahashi |
| 4,313,837 A | 2/1982 | Vukasovich et al. |
| 4,316,939 A | 2/1982 | Guyomard |

(Continued)

FOREIGN PATENT DOCUMENTS

| | | |
|---|---|---|
| CA | 1120253 | 3/1982 |
| CN | 1198690 | 11/1998 |

(Continued)

OTHER PUBLICATIONS

Bieganska, Barbara et al., "Influence of barrier Pigments on the Performance of Protective Organic Coatings," Progress in Organic Coatings, 16 (1988) pp. 219-229, Elsevier Sequoia, Netherlands.

(Continued)

*Primary Examiner* — Kregg T Brooks
(74) *Attorney, Agent, or Firm* — Pauly, DeVries Smith & Deffner LLC

(57) ABSTRACT

Corrosion and chip-resistant coatings for high tensile steel components, such as automotive coil springs, can be formed from a coating composition comprising a primer having an epoxy resin with the proviso that the epoxy resin does not have an EEW of about 860 to about 930, a polyhydroxyl functional phenolic curing agent having a HEW of about 200 to about 500, and a platy filler. The primer contains less than 20 wt % zinc. The topcoat includes an epoxy resin having an epoxy equivalent weight of about 450 to about 1400, an elastomer-modified epoxy resin having an epoxy equivalent weight of about 1000 to about 1600, a foaming agent and a reinforcing fiber.

12 Claims, No Drawings

(56) References Cited

U.S. PATENT DOCUMENTS

| | | |
|---|---|---|
| 4,345,004 A | 8/1982 | Miyata et al. |
| 4,381,334 A | 4/1983 | Balk et al. |
| 4,491,554 A | 1/1985 | Hamel et al. |
| 4,572,868 A | 2/1986 | Hosaka et al. |
| 4,581,293 A | 4/1986 | Saunders |
| 4,804,581 A | 2/1989 | Geary et al. |
| 4,933,382 A | 6/1990 | Kitagawa et al. |
| 5,030,285 A | 7/1991 | Vallvey et al. |
| 5,062,284 A | 11/1991 | Kubo et al. |
| 5,063,095 A | 11/1991 | Kitagawa et al. |
| 5,091,242 A | 2/1992 | Chung |
| 5,097,006 A | 3/1992 | Kapilow et al. |
| 5,137,567 A | 8/1992 | Aubareda et al. |
| 5,196,261 A | 3/1993 | Ono et al. |
| 5,248,400 A | 9/1993 | Franks et al. |
| 5,264,503 A | 11/1993 | Marx |
| 5,274,006 A | 12/1993 | Kagoshima et al. |
| 5,334,631 A | 8/1994 | Durand |
| 5,338,347 A | 8/1994 | Rohr et al. |
| 5,342,885 A | 8/1994 | St Clair |
| 5,461,112 A | 10/1995 | Masse et al. |
| 5,468,461 A | 11/1995 | Hosoda et al. |
| 5,562,989 A | 10/1996 | Statz |
| 5,569,687 A | 10/1996 | Sanborn et al. |
| 5,614,323 A | 3/1997 | Chang |
| 5,677,367 A | 10/1997 | Savin |
| 5,686,185 A | 11/1997 | Correll et al. |
| 5,789,482 A | 8/1998 | Eldin et al. |
| 5,789,498 A | 8/1998 | Ohnishi et al. |
| 5,981,086 A | 11/1999 | Siminski |
| 6,022,927 A | 2/2000 | Decker et al. |
| 6,025,438 A | 2/2000 | Hinterwaldner et al. |
| 6,069,221 A | 5/2000 | Chasser et al. |
| 6,184,311 B1 | 2/2001 | Okeeffe et al. |
| 6,254,751 B1 | 7/2001 | Reiter et al. |
| 6,284,846 B1 | 9/2001 | Ambrose et al. |
| 6,294,610 B1 | 9/2001 | Daly et al. |
| 6,346,292 B1 | 2/2002 | Grubb et al. |
| 6,403,222 B1 | 6/2002 | Harrison |
| 6,521,706 B1 | 2/2003 | Desai et al. |
| 6,537,610 B1 | 3/2003 | Springer et al. |
| 6,663,968 B2 | 12/2003 | Grubb et al. |
| 6,677,032 B1 | 1/2004 | Grubb et al. |
| 6,770,702 B1 | 8/2004 | Muller et al. |
| 7,018,716 B2 | 3/2006 | Grubb et al. |
| 7,244,780 B1 | 7/2007 | Robinson et al. |
| 7,473,717 B2 | 1/2009 | Muenz et al. |
| 10,011,736 B2 | 7/2018 | Lucas |
| 2001/0002274 A1 | 5/2001 | Lessmeister et al. |
| 2001/0046555 A1 | 11/2001 | Lessmeister et al. |
| 2001/0051227 A1 | 12/2001 | Jung et al. |
| 2003/0124248 A1 | 7/2003 | Tullos et al. |
| 2004/0009300 A1 | 1/2004 | Shimakura et al. |
| 2004/0048954 A1 | 3/2004 | Thieben |
| 2004/0101670 A1 | 5/2004 | Grubb et al. |
| 2004/0266899 A1 | 12/2004 | Muenz et al. |
| 2007/0116963 A1 | 5/2007 | Sakakibara |
| 2007/0172665 A1 | 7/2007 | Kunita et al. |
| 2009/0110934 A1 | 4/2009 | Nicholl et al. |
| 2009/0176903 A1 | 7/2009 | Muenz et al. |
| 2009/0270533 A1 | 10/2009 | Umehara et al. |
| 2010/0255296 A1 | 10/2010 | Kunita et al. |
| 2010/0256282 A1 | 10/2010 | Nicholl et al. |
| 2010/0297422 A1 | 11/2010 | Lucas |
| 2012/0258316 A1 | 10/2012 | Lucas |

FOREIGN PATENT DOCUMENTS

| | | |
|---|---|---|
| CN | 101033364 | 9/2007 |
| CN | 101952374 | 1/2011 |
| DE | 3018765 | 11/1981 |
| DE | 10020481 | 10/2001 |
| EP | 0040243 | 11/1981 |
| EP | 0292771 | 11/1988 |
| EP | 0440292 | 8/1991 |
| EP | 0500009 | 8/1992 |
| EP | 0525870 | 2/1993 |
| EP | 0526153 | 2/1993 |
| EP | 0631536 | 1/1995 |
| EP | 0882101 | 12/1998 |
| EP | 0994141 | 4/2000 |
| EP | 1726621 | 11/2006 |
| EP | 1165712 | 6/2008 |
| EP | 1972672 | 9/2008 |
| GB | 1407851 | 9/1975 |
| GB | 1565379 | 4/1980 |
| JM | 06009903 | 1/1994 |
| JP | 49039625 | 4/1974 |
| JP | 58047064 | 3/1983 |
| JP | 58114766 | 7/1983 |
| JP | S58114767 | 8/1983 |
| JP | 58168619 | 10/1983 |
| JP | 59029154 | 8/1984 |
| JP | 59193970 | 11/1984 |
| JP | 61148274 | 7/1986 |
| JP | 03000785 | 1/1991 |
| JP | H03170523 | 7/1991 |
| JP | 06329955 | 11/1994 |
| JP | 07026119 | 1/1995 |
| JP | H07216297 | 8/1995 |
| JP | 08010686 | 1/1996 |
| JP | 09012926 | 1/1997 |
| JP | 09272820 | 10/1997 |
| JP | H11188309 | 7/1999 |
| JP | 2000143938 | 5/2000 |
| JP | 2000176373 | 6/2000 |
| JP | 2000190422 | 7/2000 |
| JP | 2002105393 | 4/2002 |
| JP | 2003286435 | 10/2003 |
| JP | 2004352994 | 12/2004 |
| JP | 2006096905 | 4/2006 |
| JP | 2006096928 | 4/2006 |
| JP | 4020557 | 10/2007 |
| JP | 2007313475 | 12/2007 |
| JP | 2007314712 | 12/2007 |
| JP | 2007314762 | 12/2007 |
| WO | 9114745 | 10/1991 |
| WO | 9211324 | 7/1992 |
| WO | 9317851 | 9/1993 |
| WO | 0055268 | 9/2000 |
| WO | 03093375 | 11/2003 |
| WO | 2004046245 | 6/2004 |
| WO | 2005028580 | 3/2005 |
| WO | 2006005136 | 1/2006 |
| WO | 2006038491 | 4/2006 |
| WO | 2006129827 | 12/2006 |
| WO | 2007025007 | 3/2007 |
| WO | 2007138396 | 12/2007 |
| WO | 2009129088 | 10/2009 |
| WO | 2011012627 | 2/2011 |

OTHER PUBLICATIONS

Bulletin of the American Physical Society, Programme of the 1956 March Meeting at Pittsburgh, PA, No. 3, Mar. 15-17, 1956, pp. 122-123.

Dow Epoxy Powder Coatings, Hardeners, Oct. 2001, pp. 1-6.

Elastomer-Modified Epoxy Powder Coatings: A Review, Ralph Drake, BF Goodrich Specialty Chemicals, Apr. 13, 1994, vol. 184, No. 4347, pp. 151-154.

Encyclopedia of Polymer Science and Engineering, vol. 3, Cellular Materials to Composites, 1985, pp. 552, 575-577.

Encyclopedia of Polymer Science and Engineering, vol. 6, Emulsion Polymerization to Fibers, Manufacture, 1985, pp. 362-367.

English Translation of Chinese Application No. 2008102131717 Office Action dated Jan. 31, 2011.

English Translation of Chinese Patent Application No. 2009801023012 Office Action dated Jul. 24, 2012.

English Translation of Chinese Patent Application No. 201080032749.4 Office Action dated Jul. 26, 2013.

English Translation of Japanese Patent Application No. 2008-208848 Office Action dated Oct. 5, 2011.

(56) References Cited

OTHER PUBLICATIONS

English Translation of Japanese Patent Application No. 2012-522155 Office Action dated Jul. 16, 2013.
English Translation of Mexico Patent Application No. MX/a/2008/013642 Office Action dated Mar. 19, 2013.
Epiote Resin Data Sheet (no date).
European Examination Report dated Nov. 23, 2010 for related EP Application No. 10156454.0.
European Patent Application No. 08003475.4 Search Report, dated Jun. 23, 2008.
European Search Report from related EP Application No. 08250931.6 dated Jul. 7, 2009.
European Search Report from related EP Application No. 10156454.0 dated Jul. 22, 2010.
European Search Report from related EP Application No. 10160331.4 dated Oct. 6, 2010.
"File History," for U.S. Appl. No. 13/387,431 (parent application to U.S. Appl. No. 16/002,093) downloaded Feb. 25, 2019 (517 pages).
General Motors Engineering Standards, Materials and Processes-Procedures, Cass Test, Copper-Accelerated ACetic Acid Salt Spray Test (FOG), GM4476P, Nov. 1988, p. 1-5.
General Motors Engineering Standards, Materials and Processes-Procedures, Chip Resistance of Coating GM9508P, Jul. 1991, p. 1-8.
General Motors Engineering Standards, Materials and Processes-Procedures, Scab Corrosion Creepback of Elp Paint Systems on Metal Substrates, GM9511P, Oct. 1986, p. 1-2.
International Application No. PCT/EP2009/050738 Search Report and Written Opinion dated May 8, 2009.
International Patent Application No. PCT/EP2009/050738 Preliminary Report on Patentability dated Feb. 8, 2010.
International Patent Application No. PCT/EP2010/060907 Search Report dated Mar. 22, 2011.
NERAC (computerized literature search) performed by Jeffery Casavant, Sep. 29, 1998.
Paint Additives Recent Developments, G.B. Rothenberg, Noyes Data Corporation, 1978, pp. 175-177.
Polymer Preprints, Vo. 32, No. 3, Aug. 1991, American Chemical Society, Aug. 12, 1991, pp. 358-359.
Polymer Science Dictionary, 2nd Ed., Mark Alger, Apr. 7, 1999, pp. 5-6.
Polymer Wax and the Use Thereof in Powder Coatings, Zhong Jianghai et al, pp. 1-5, Dec. 31, 2002.
Powder Coatings Foaming Agents, Dr. Tina Grubb, Computerized Literature Search, Jan. 7, 1997.
Rubber Modified Powder Coating Resin, KR-102, Kukdo Chemical Co., Ltd. Jul. 20, 3=2000, pp. 1-3.
Shell Chemicals Systems & Solutions Newsletter, Apollo and Resins & Versatics Join Forces, Jack Christenson, Jul. 2000, vol. 2, Issue 3, pp. 1-3.

POWDER COATING COMPOSITIONS CAPABLE OF HAVING A SUBSTANTIALLY NON-ZINC CONTAINING PRIMER

REFERENCE TO RELATED APPLICATION

This application is a continuation of U.S. patent application Ser. No. 13/387,431, filed Jan. 27, 2012, which is a national stage filing under 35 U.S.C. § 371 of PCT/EP2010/060907, filed Jul. 27, 2010, which claims priority of European Patent Application No. 09169332.5, filed Sep. 3, 2009 and U.S. Provisional Patent Application No. 61/229,565, filed Jul. 29, 2009, the contents of which are each incorporated herein by reference in their entirety.

BACKGROUND OF THE INVENTION

1. Field of the Invention

The invention relates to corrosion and chip resistant coating compositions that can be used for highly stressed steel such as automotive springs, and to highly stressed steel coated with the coating compositions.

2. Description of the Related Art

Compositions for coating steel are generally well known in the art.

U.S. Pat. No. 5,334,631 discloses a coating composition comprising an epoxy resin, a curing agent, lamellar zinc and zinc dust. A second layer may be applied as a topcoat coating, such as a powder coating composition based on a polyester resin as a binder and an epoxy group containing component, such as trisglycidylisocyanurate, as a curing agent. Stated applications for this coating are metals such as iron, steel, copper and aluminum, with examples showing use on the outside of a gas tank.

U.S. Pat. No. 7,018,716 discloses a coating comprising an epoxy resin that contains zinc, either as a single coat or as a primer coat, with a topcoat that does not contain zinc, and is reinforced by the addition of fibers and/or by a foaming agent which renders it porous. Stated applications for this coating include high tensile stress steel, such as coil springs.

U.S. Pat. No. 4,804,581 discloses a metal substrate coated with an elastomer-modified epoxy-containing coating primer and a carboxyl-functional material, such as a carboxyl-functional polyester resin, as a top-coat. The coating composition is said to be useful in automotive applications to provide desired anti-chip protection, but the examples show use on grounded steel panels, not highly stressed steel items, such as springs.

For the protection of high tensile strength springs, earlier coating systems used most preferably a combination of a zinc-rich epoxy thermoset primer for exceptional corrosion resistance with an overlying coating of a thermoplastic topcoat applied at a high film thickness to provide superior chip resistance (U.S. Pat. No. 5,981,086). In some cases, epoxy electrocoat was substituted for the zinc-rich primer.

Although typically poorer in chip resistance and cold temperature physical properties, U.S. Pat. No. 7,018,716 reports an epoxy thermoset topcoat with competing performance to the thermoplastic topcoat at reduced cost. Changes in the marketplace with respect to increased demand for zinc metal and associated higher prices have made zinc containing coatings less attractive. The applied cost of zinc containing coatings has also been also hurt by their relatively high density which equates to higher material usage in relation to area coated. Accordingly, there is a need for substantially non-zinc containing coatings for applications such as highly stressed steel.

SUMMARY OF THE INVENTION

The present invention relates to corrosion and chip resistant dual-coat powder coating systems, in which an epoxy thermoset primer primarily provides for corrosion resistance and an epoxy thermoset topcoat primarily provides for chip resistance. The present invention also relates to single-coat powder coating systems, in which an epoxy thermoset primer is applied without a topcoat. In some embodiments, the coating systems are useful for high tensile steel alloys such as automotive suspension springs.

In one embodiment of the invention, a coating composition comprises:
  (I) an epoxy thermoset primer comprising:
    (i) an epoxy resin;
    (ii) a polyhydroxyl functional phenolic curing agent having a HEW of about 200 to about 500; and
    (iii) a platy filler,
    wherein said epoxy thermoset primer contains less than 20 wt % zinc.

In some embodiments of the invention, the coating composition comprises an epoxy resin with the proviso that the epoxy resin does not have an epoxy equivalent weight (EEW) of about 860 to about 930.

In some embodiments of the invention, the coating composition further comprises an epoxy thermoset topcoat comprising:
  (i) an epoxy resin having an EEW of about 520 to about 1300;
  (ii) an elastomer-modified epoxy resin having an EEW of about 1000 to about 1600;
  (iii) a foaming agent; and
  (iv) a reinforcing fiber.

Other embodiments of the invention include methods for applying coating compositions to high tensile steel alloys, and high tensile steel alloys such as springs coated with the compositions.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

Other than in the operating examples, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Unless stated otherwise, all percentages, ratios and proportions herein are by weight and particularly unless otherwise specifically stated, the proportions of the components in the compositions described are given in percentage pertaining to the total mass of the mixture of these components.

Also herein, the recitations of numerical ranges by endpoints include all numbers subsumed within that range (e.g., 1 to 5 includes 1, 1.5, 2, 2.75, 3, 3.80, 4, 5, etc.).

Also herein, "a," "an," "the", "at least one", and "one or more" are used interchangeably.

Also herein, the term "comprises" and variations thereof do not have a limiting meaning where these terms appear in the description and claims.

The terms "for example" and the like, as well as the exemplary compounds, ranges, parameters and the like disclosed throughout the application and claims are intended to identify embodiments of the invention in a non-limiting manner. Other compounds, ranges, parameters and the like can be employed by those skilled in the art without departing from the spirit and scope of the invention.

Driven by design considerations and lighter weight components to aid in fuel economy, automobile manufacturers are increasingly employing lighter weight, high tensile strength suspension springs in their vehicle designs. These springs with their lower metal mass achieve the strength of more massive springs through a combination of the specific steel alloy used in conjunction with other processing aspects.

Offsetting some of the advantages, the highly engineered properties of these springs are achieved at some cost in terms of their overall potential for breakage. Typically, since such springs are much harder and operate with much higher internal stresses, relatively little metal mass loss produced by corrosion pitting for example can cause spring breakage. Since vehicle suspensions can be subjected to extremely corrosive environments, particularly in northerly climates with the use of various road salts, protective coatings with exceptional chip resistance to flying gravel and corrosion resistance must be used to thoroughly protect high tensile strength springs.

Conventional powder coating systems include primers which typically contain zinc in amounts in excess of 50 wt % in order to provide corrosion resistance. The primers of the present invention satisfy the corrosion and chip resistance standards of the automotive industry, yet the primers may contain less than 20 wt % zinc. In some embodiments of the invention, the primer contains zinc in an amount of less than 20 wt %. In some embodiments, the primer contains zinc in an amount of less than about 15 wt %. In some embodiments, the primer contains zinc in an amount of less than about 10 wt %. In some embodiments, the primer contains zinc in an amount of less than about 5 wt %. In some embodiments, the primer is substantially zinc-free. In some embodiments, the primer contains zero zinc. In such embodiments, the zinc content includes any amount of zinc that may comprise a platy filler. A primer that contains less than 20 wt % zinc, less than about 15 wt % zinc, less than about 10 wt % zinc, or less than about 5 wt % zinc includes a primer that is substantially zinc-free and also includes a primer that contains zero zinc. The topcoats of the invention may contain zinc, may contain zinc in an amount of less than about 50 wt %, may contain zinc in an amount of less than about 25 wt %, may contain zinc in an amount of less than about 5 wt %, may be substantially zinc-free, or may contain zero zinc. Similarly, a topcoat that contains less than about 50 wt % zinc, less than about 25 wt % zinc, or less than about 5 wt % zinc includes a topcoat that is substantially zinc-free and a topcoat that contains zero zinc.

Although the use of primers and topcoats of the invention fulfill a need in terms of lower cost protective coatings for highly stressed steel and particularly high tensile strength suspension springs, discrete primers and topcoats may be selected due to the somewhat contrary properties of corrosion resistance and chip resistance. Those primers and topcoats which possess good corrosion resistance do not always have the best chip resistance and vice versa.

One of the main functions of the primers of the present invention which may be applied over zinc phosphate pretreated steel is to provide corrosion resistance. In addition, some measure of chip resistance may also be provided by the primer to accommodate those cases where less than ideal topcoat thickness is used. Accordingly, the primers of the present invention provide corrosion and chip resistance by containing an epoxy resin, a polyhydroxyl functional phenolic curing agent having a hydroxyl equivalent weight (HEW) of about 200 to about 500, and a platy filler.

Epoxy resins for use in the present invention may be obtained from The Dow Chemical Company and can be identified by their EEW range. Some epoxy resins may have overlapping EEW ranges but are nonetheless distinguishable. For example, The Dow Chemical Company supplies the epoxy resin D.E.R.™ 671 having an EEW of about 475 to about 550 as well as the epoxy resin D.E.R.™ 661 having an EEW of about 450 to about 560.

In some embodiments, an epoxy resin is selected such that the EEW is between a lower limit of about 730 and an upper limit of about 1400. In some embodiments, the primer comprises an epoxy resin with the proviso that the epoxy resin does not have an EEW of about 860 to about 930. In some embodiments, an epoxy resin is selected such that the EEW is between a lower limit of about 730 and an upper limit of about 1400, with the proviso that the epoxy resin does not have an EEW of about 860 to about 930. An epoxy resin having an EEW of about 860 to about 930 is available from The Dow Chemical Company as D.E.R.™ 664UE. For non-limiting example, an epoxy resin such as D.E.R.™ 6155 having an EEW of about 1250 to about 1400 is an example of an epoxy resin having an EEW between the lower limit of about 730 and the upper limit of about 1400. Also, for non-limiting example, the epoxy resin D.E.R.™ 6330-A10 available from The Dow Chemical Company having an EEW of about 780 to about 900 is not considered to be an epoxy resin having an EEW of about 860 to about 930, even though the EEW ranges overlap.

The epoxy resin may be, for non-limiting example, a bisphenol A epoxy resin having an EEW of about 730 to about 820, a bisphenol A epoxy resin having an EEW of about 1250 to about 1400, a bisphenol A epoxy resin having an EEW of about 780 to about 900, a bisphenol A epoxy resin having an EEW of about 750 to about 850, a bisphenol A epoxy resin having an EEW of about 730 to about 840, a bisphenol A epoxy resin having an EEW of about 1150 to about 1300, or a combination thereof. Such epoxy resins are available from The Dow Chemical Company as D.E.R.™ 663U, D.E.R.™ 6155, D.E.R.™ 6330-A10, and D.E.R.™ 672U and from The Kukdo Chemical Company as KD213 and KD214M, respectively.

As used herein and further illustrated in the examples, the term "an effective amount" of an epoxy resin, an "effective amount" of a polyhydroxyl functional phenolic curing agent, and an "effective amount" of a filler material respectively describe amounts of epoxy resin, polyhydroxyl functional phenolic curing agent and filler material that contribute to a primer which satisfies industrially acceptable corrosion resistance standards for the intended application, such as in the case of high tensile suspension springs GM specification GMW14656.

Some embodiments employ an effective amount of an epoxy resin for use in the primers of the present invention including, for non-limiting example, epoxy resins based on 2,2-bis-(4-hydroxyphenol)-propane with softening points of between about 80° C. and about 125° C. For non-limiting example, the softening point is between about 90° C. and about 115° C. The epoxy resin may be chosen from a variety of epoxy resins useful for coating powders, such as, without limitation, those produced by the reaction of epichlorohydrin or polyglycidyl ether and an aromatic polyol such as, without limitation, bisphenol, e.g., bisphenol A. The epoxy resin may have an epoxy functionality greater than 1.0, and alternatively greater than 1.9.

Such epoxy resins may be produced, for non-limiting example, by an etherificiation reaction between an aromatic or aliphatic polyol and epichlorohydrin or dichlorohydrin in the presence of an alkali such as, without limitation, caustic soda. The aromatic polyol may be, for non-limiting example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihdyroxybenzophenone or 1,5-pentanediol, 1,6-hexanediol, diethylene glycol, triethylene glycol, polyethylene glycol, polypropylene glycol, dipropylene glycol, a diglycidyl ether or a condensed glycidyl ether of a diol. Oxirane group-containing polymers that can be used as the epoxy resin in primers according to this invention include, without limitation, polyglycidylfunctional acrylic polymers or epoxy novolac resins.

Other epoxy resins for use in the primer include, for non-limiting example, epoxidized phenol-novolac resins with a softening point between about 80° C. and about 125° C. In some embodiments, the softening point is between about 90° C. and about 115° C. In some embodiments, a diglycidyl ether of bisphenol-A (DGEBA) novolac modified epoxy resin is used.

In some embodiments of the invention, the bisphenol A epoxy resin is obtained, for non-limiting example, from condensation polymerization of bisphenol A with epichlorohydrin. Other resin chemistries can be employed such as, without limitation, a bisphenol A epoxy resin cured with dicyandiamine or co-reacted with a carboxy functional polyester (hybrid).

The amount of the epoxy resin or combination of epoxy resins in the primer may vary in relation to the amounts of the additives and fillers. For non-limiting example, per the phr (parts per hundred resin) formula convention, the resin and curing agent total is set at 100 parts. The percent of the total epoxy resin in the formulation then varies as a function of additives and filler phr level. In some embodiments, the epoxy resin or combination of epoxy resins is present in an amount from about 35 to about 95 parts of the available 100 parts.

In some embodiments of the invention, the primer contains an effective amount of a polyhydroxyl phenolic curing agent. The polyhydroxyl functional phenolic curing agent may contain 2-methylimidazole. In some embodiments, the polyhydroxyl functional phenolic curing agent has a hydroxyl equivalent weight (HEW) of from about 200 to about 500. The polyhydroxyl functional phenolic curing agent may be formed from bisphenol A termination of low molecular weight diglycidyl ethers of bisphenol A. In some embodiments, the curing agent is a phenolic curing agent having a HEW of about 240 to about 270 and contains about 2% of a 2-methylimidazole cure accelerator.

The amount of the curing agent or combination of curing agents may vary in relation to the amounts of the additive and filler. For non-limiting example, per the phr (parts per hundred resin) formula convention, the resin and curing agent total is set at 100 parts. The percent of the total curing agent in the formulation then varies as a function of additive and filler phr level. In some embodiments, the curing agent or combination of curing agents is present in an amount from about 5 to about 65 parts of the available 100 parts.

The primers of the present also include an effective amount of a platy filler material. Platy filler materials for use in the present invention include, for non-limiting example, about a 10 to about 35 μm median particle size complex aluminosilicate (muscovite mica), about a 10 to about 35 um median particle size magnesium silicate (talc), about a 150 to about 200 um median particle size C modified composition glass flake, and combinations thereof. Theses fillers have platy particle geometry and tend to orient parallel to the primer coating layer which improves corrosion resistance through improved barrier properties. The median particle size for the muscovite mica, talc and glass flake has been established by sedigraph (sedimentation analysis) and is used in some embodiments at about 10 to about 40 phr (parts per hundred of resin). In some embodiments, the platy filler may comprise lamellar zinc in an amount less than 20 wt %. As noted above, in such an embodiment, the less than 20 wt % zinc content includes any amount of zinc that may comprise a platy filler.

In some embodiments of the invention, the primer may include fillers, such as without limitation complex aluminosilicate (muscovite mica), calcium metasilicate (wollastonite), micronized magnesium silicate (talc), zinc oxide powder, zinc dust, quartz powder, aluminum silicates, calcium silicates, magnesium silicates, calcium carbonate, barium sulphate, calcium sulphate, aluminum oxide, glass flake, C modified composition glass flake, and combinations thereof.

Some embodiments of the invention include about a 2 to about 15 μm median particle size calcium metasilicate (wollastonite), and/or about a 0.5 to about 3.0 μm median particle size micronized magnesium silicate (talc). These fillers function to improve corrosion resistance through a combination of pH regulation and moisture absorption properties. Median particle sizes for the wollastonite and micronized talc have been established by laser diffractive technique and are used in some embodiments at about 10 to about 40 phr and about 1 to about 8 phr respectively.

In some embodiments, the topcoat includes an effective amount of an epoxy resin having an EEW of about 520 to about 1300. The epoxy resin may be, for non-limiting example, a bisphenol A epoxy resin having an EEW of about 730 to about 820, a bisphenol A epoxy resin having an EEW of about 860 to about 930, a bisphenol A epoxy resin having an EEW of about 520 to about 560, a bisphenol A epoxy resin having an EEW of about 730 to about 840, or a bisphenol A epoxy resin having an EEW of about 1150 to about 1300. Such epoxy resins are available from The Dow Chemical Company and from The Kukdo Chemical Company.

As used herein, the term "an effective amount" of an epoxy resin, an "effective amount" of an elastomer-modified epoxy resin, an "effective amount" of a carboxyl functional polyester resin, an "effective amount" of a foaming agent, and an "effective amount" of a reinforcing fiber respectively describe an amount of epoxy resin, elastomer-modified epoxy resin, carboxyl functional polyester resin, foaming agent, and reinforcing fiber that contribute to a topcoat which satisfies industrially acceptable standards for the intended application, such as in the case of high tensile suspension springs, GM specification GMW14656. Non-limiting examples of epoxy resins for use in the topcoat include epoxy resins based on 2,2-bis-(4-hydroxyphenol)-propane with softening points of between about 80° C. and about 125° C.

The amount of the epoxy resin or combination of epoxy resins in the topcoat may vary in relation to the amounts of the additive and reinforcing fiber. For non-limiting example, per the phr (parts per hundred resin) formula convention, the epoxy resin, the elastomer-modified epoxy resin and, optionally, the carboxyl functional polyester resin total is set at 100 parts. The percent of the total epoxy resin in the formulation then varies as a function of additives and reinforcing fiber phr level. In some embodiments, the epoxy resin or combination of epoxy resins is present in an amount from about 10 to about 85 parts of the available 100 parts.

The epoxy resin may be chosen from a variety of epoxy resins useful for coating powders, such as, without limitation, those produced by the reaction of epichlorohydrin or polyglycidyl ether and an aromatic polyol such as, without limitation, bisphenol, e.g., bisphenol A. The epoxy resin may have an epoxy functionality greater than 1.0, and alternatively greater than 1.9. Generally, the epoxy equivalent weight may be from about 450 to about 1400, and alternatively from about 520 to about 1300.

Epoxy resins may be produced, for non-limiting example, by an etherificiation reaction between an aromatic or aliphatic polyol and epichlorohydrin or dichlorohydrin in the presence of an alkali such as, without limitation, caustic soda. The aromatic polyol may be, for non-limiting example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihdyroxybenzophenone or 1,5-pentanediol, 1,6-hexanediol, diethylene glycol, triethylene glycol, polyethylene glycol, polypropylene glycol, dipropylene glycol, a diglycidyl ether or a condensed glycidyl ether of a diol. Oxirane group-containing polymers that can be used as the epoxy resin in the topcoats according to this invention include, without limitation, polyglycidyl-functional acrylic polymers or epoxy novolac resins. In some embodiments, a diglycidyl ether of bisphenol-A (DGEBA) novolac modified epoxy resin is used.

The topcoat includes an effective amount of an elastomer-modified epoxy resin having an EEW of about 1000 to about 1600. In some embodiments of the invention, the elastomer-modified epoxy resin is a bisphenol A epoxy resin which has been adducted with CTBN (carboxyl terminated butadiene acrylonitrile) rubber producing a composite resin with an EEW of about 1250 to about 1500 g/eq or about 1100 to about 1300 g/eq. In some embodiments, the Tg is about 30 to about 50° C. Tg is the Glass Transition Temperature which is the critical temperature at which a non-crystalline material changes its behavior from a 'glassy' to 'rubbery' state. 'Glassy' in this context means hard and brittle (and therefore relatively easy to break), while 'rubbery' means elastic and flexible.

The amount of the elastomer-modifed epoxy resin or combination of elastomer-modifed epoxy resins in the topcoat may vary in relation to the amounts of the additives and reinforcing fiber. For non-limiting example, per the phr (parts per hundred resin) formula convention, the epoxy resin, the elastomer-modified epoxy resin and the carboxyl functional polyester resin total is set at 100 parts. The percent of the total elastomer-modifed epoxy resin in the formulation then varies as a function of additive and reinforcing fiber phr level. In some embodiments, the elastomer-modifed epoxy resin or combination of elastomer-modifed epoxy resins is present in an amount from about 5 to about 35 parts of the available 100 parts.

In some embodiments of the invention, the topcoat also includes an effective amount of a carboxy functional polyester resin with an acid number of about 25 to about 85 mg KOH/g or from about 45 to about 75 mg KOH/g for enhanced chip resistance.

The amount of the carboxy functional polyester resin or combination of carboxy functional polyester resins in the topcoat may vary in relation to the amounts of the additives and reinforcing fiber. For non-limiting example, per the phr (parts per hundred resin) formula convention, the epoxy resin, the elastomer-modified epoxy resin and the carboxyl functional polyester resin total is set at 100 parts. The percent of the total carboxy functional polyester resin in the formulation then varies as a function of additives and reinforcing fiber phr level. In some embodiments, the carboxy functional polyester resin or combination of carboxy functional polyester resins is present in an amount from about 30 to about 85 parts of the available 100 parts.

The carboxyl-functional polyester resins can be prepared by any commonly known method, such as for non-limiting example, condensation reactions between aliphatic di- or poly-hydric alcohols and cycloaliphatic, acyclic or aliphatic di- or poly-carboxylic acids or anhydrides thereof, or between aliphatic dihydric alcohols and aromatic di- or poly-carboxylic acids or anhydrides thereof. For non-limiting example, the carboxyl-functional polyester resins can be prepared from aliphatic di- or poly-hydric alcohols, particularly lower aliphatic diols such as, without limitation, ethylene glycol, 1,2-propane diol, 1,3-propane diol, 1,2-butanediol, 1,3-butanediol, 1,4-butanediol, 2,2-dimethyl propane-1,3-diol (i.e., neopentyl glycol), 1,6-hexanediol, 2,3-hexanediol, 2,5-hexanediol, diethylene glycol or dipropylene glycol. Polyols such as, without limitation, trimethylolpropane or the like can also be used to prepare the carboxyl-functional polyesters. Examples of suitable di- or poly-carboxylic acids and anhydrides include, without limitation, phthalic acid, isophthalic acid, terephthalic acid, malonic acid, succinic acid, glutaric acid, adipic acid, pimelic acid, suberic acid, azelaic acid, sebacic acid, dodecanedioic acid, tetrahydrophthalic acid, hexahydrophthalic acid, and maleic acid and anhydrides of such acids. In some embodiments, the carboxyl-functional polyester resin is an aromatic containing polyester, for non-limiting example, a polyester prepared from aromatic carboxylic acid such as, without limitation, phthatic acid, isophthalic acid or terephthalic acid and a polyol such as, without limitation, neopentyl glycol.

An effective amount of a foaming/blowing agent additive is present in the topcoat to establish a porous structure within the coating film. The porous structure imparts physical properties to the coating such as the ability to absorb impact energy without fracturing.

In other embodiments of the invention, commercially desirable porosity for high tensile suspension springs is achieved when the cured topcoat exhibits about a 15% to about 50% reduction in density from that of the theoretical topcoat density without porosity. The cured topcoat density is calculated by the ratio of measured coating weight on a coated panel to coating volume on the same panel. Coating volume on the coated panel is arrived at in an integrative fashion by deriving the average coating thickness with multiple measurements taken across the subdivided panel which is then multiplied by panel area. In some embodiments, the foaming and blowing agents are used at about 0.2 to about 2.0 phr (parts per hundred of resin). Foaming agents with p,p'-oxybis(benzenesulfonylhydrazide) and activated azodicarbonamide based compositions are employed in some embodiments. Other foaming agents include, without limitation, p-toluenesulfonylhydrazide based foaming agents An effective amount of a reinforcing fiber is present in the topcoat to recover any loss of strength caused by the presence of a foaming/blowing agent. For non-limiting example, a range of aluminosilicate glass fibers or natural mined calcium metasilicate (wollastonite) fibers can be employed. An average diameter of about 3 to about 15 um and an average aspect ratio (within the context of coatings fillers, aspect ratio is defined as the ratio of a filler particle's largest dimension to its smallest) of about 5 to about 20 is employed in some embodiments. Other reinforcing fibers such as, without limitation, aramid and carbon could be used as well. Reinforcing fibers in the amount of about 20 to about 70 phr are employed in some embodiments of the invention. In some embodiments, the reinforcing fiber is the E-glass silane treated glass fibers with a diameter of 16 microns and a length of 150 microns, commercially available from Fibertec.

The primers and topcoats can also include additives, such as, without limitation, pigments, catalysts/curing agents, degassing agents, flow control agents and antioxidants.

Pigments for use in the primer and topcoat compositions of the invention include, for non-limiting example, titanium dioxide, iron oxide (yellow, brown, red, black), carbon black and organic pigments. These pigments can be added in conventional amounts known to those in the art.

In addition to the phenolic curing agents described above present in the primer, the coating composition can include catalyst/curing agent additives such as for non-limiting example, quaternary ammonium salts, quaternary phosphonium salts, phosphines, imidazoles metal salts, and combinations thereof. Examples of such additives include, without limitation, tetrabutylammonium chloride, tetrabutylammonium bromide or tetrabutylammonium iodide, ethyltriphenyl phosphonium acetate, triphenylphosphine, 2-methyl imidazole, dibutyltin dilaurate, and combinations thereof. The catalyst/curing agent, when used in some embodiments, is present in the composition in amounts of between about 0 and about 5 weight percent, and alternatively from about 0.2 to about 2 percent by weight based on total weight of the coating composition.

The topcoat may include an effective amount of a curing agent in some embodiments of the invention. The curing agent may be a polyhydroxyl functional phenolic curing agent that contains 2-methylimidazole. In some embodiments, the polyhydroxyl functional phenolic curing agent has a hydroxyl equivalent weight (HEW) of from about 200 to about 500. The polyhydroxyl functional phenolic curing agent may be formed from bisphenol A termination of low molecular weight diglycidyl ethers of bisphenol A. In some embodiments, the curing agent is a phenolic curing agent having a HEW of about 230 to about 260 and contains a 2-methylimidazole cure accelerator.

The amount of the curing agent or combination of curing agents may vary in relation to the amounts of the additives and the reinforcing fiber. For non-limiting example, per the phr (parts per hundred resin) formula convention, the elastomer-modified epoxy resin and the carboxyl functional polyester resin total is set at 100 parts. The percent of the total curing agent in the formulation then varies as a function of additives and reinforcing fiber phr level. In some embodiments, the curing agent or combination of curing agents is present in an amount from about 5 to about 65 parts of the available 100 parts.

A degassing agent can be added to the composition to allow any volatile material present to escape from the film during baking. Benzoin is a degassing agent and when used in some embodiments can be present in amounts from about 0.5 to about 3.0 percent by weight based on total weight of a powder coating composition.

Flow control agents include, without limitation, lower molecular weight acrylic polymers, for non-limiting example, acrylic polymers, such as without limitation acrylic polymers having a number average molecular weight from about 1000 to about 50,000, such as, without limitation, polylauryl acrylate, polybutyl acrylate, poly(2-ethylhexyl)acrylate, poly(ethylacrylate-2-ethylhexylacrylate), polylauryl methacrylate and polyisodecyl methacrylate, and fluorinated polymers such as, without limitation, the esters of polyethylene glycol or polypropylene glycol and fluorinated fatty acids. Polymeric siloxanes of molecular weights over about 1,000 may also be used as a flow control agent, for non-limiting example, poly(dimethylsiloxane) or poly (methylphenyl) siloxane. Flow control agents can aid in the reduction of surface tension during heating of the coating powder and in elimination of crater formation. In some embodiments, the flow control agent when used is present in amounts of from about 0.05 to about 5.0 percent by weight based on the total weight of a powder coating composition.

Antioxidants include, without limitation, phenolic, phosphite, phosphonite and lactone-type antioxidants, as well as combinations thereof. In some embodiments, the antioxidants are present in an amount of from about 0 to about 3 wt %.

The coating compositions of the present invention are especially suitable for application to metals, such as, without limitation, automotive springs. However, it is also possible to apply the coating compositions to carbon, wood, glass, polymers and other substrates.

Application of the above described primer and topcoat compositions to high tensile steel can be accomplished by any known techniques, such as, without limitation, the following Methods 1 through 3. Regardless of the application technique used, the composite coating (primer & topcoat) formed on the high tensile steel alloy may contain a discrete primer, for non-limiting example from about 1.5 to about 4.0 mils thick, in contact with the pretreated steel surface. The topcoat of the composite coating may also form a discrete topcoat, for non-limiting example from about 10 to about 35 mils thick, which is bonded to the underlying primer layer. The coating composition may also be applied with a primer and without a topcoat.

Application Techniques
1. Method 1—The steel is heated to about 220 to about 380° F. for more ideal deposition followed by successive application of the primer and topcoat. The coated steel is then heated again to create a composite coating layer and achieve full property development on the coating system.
2. Method 2—The primer is applied to ambient temperature high tensile steel alloy followed by heating to about 220 to about 380° F. to fuse or partially cure the coating. The topcoat is applied to the hot steel using ideally residual heat remaining from the primer heating. The coated steel is then heated again to create a composite layer and achieve full property development on the coating system.

3. Method 3—The primer and topcoat are applied successively to ambient temperature high tensile steel in a "dry on dry" powder fashion followed by a single heat cycle of about 220 to about 380° F. to create a composite coating layer and achieve full property development on the coating system.

EXAMPLES

The invention will be further described by reference to the following non-limiting examples. It should be understood that variations and modifications of these examples can be made by those skilled in the art without departing from the spirit and scope of the invention.

Seventeen primer and nine topcoat compositions were prepared in accordance with the above Method 1 from the following mixtures of ingredients:

Primer Compositions

| Component | Primer Examples | | | | | | | |
|---|---|---|---|---|---|---|---|---|
| | Comp 1 | 2 | 3 | 4 | 5 | Comp 6 | Comp 7 | Comp 8 |
| Bisphenol A Epoxy Resin A[1A] | 75.14 | 73.24 | 71.72 | 71.17 | 55.42 | | | |
| Bisphenol A Epoxy Resin B[1A] | | | | | | 86.33 | 29.13 | 83.19 |
| Bisphenol A Epoxy Resin C[1A] | | | | | 16.30 | | | |
| Bisphenol A Epoxy Resin D[1A] (Contains Acronal 4F Flow Modifier) | 8.56 | 10.46 | 11.98 | 12.53 | 11.98 | 13.70 | 12.08 | 16.81 |
| Carboxyl Polyester Resin A[2A] | | | | | | | 58.79 | |
| Phenolic Curing Agent[3] (Contains 2-Methylimidazole) | 16.30 | 16.30 | 16.30 | 16.30 | 16.30 | | | |
| Casamid 710[4] | | | | | | | | |
| Epikure P-108[5] | | | | | | 5.00 | | 5.45 |
| 2-Methylimidazole | | | | | | | 0.38 | |
| Benzoin[6] | 0.36 | 0.44 | 0.51 | 0.53 | 0.51 | 0.53 | 0.53 | |
| Black Pearls 800[7] | 0.31 | 0.38 | 0.44 | 0.46 | 0.44 | 0.46 | 0.46 | |
| Tiona 595t[8] | 3.12 | 3.80 | 4.36 | 4.56 | 4.36 | 4..56 | | 7.64 |
| Muscovite Mica Filler[9] | | 22.20 | 25.42 | 26.58 | 25.42 | | 26.69 | |
| Calcium Metasilicate (Wollastonite) Filler[10] | | | 14.52 | 15.19 | 14.52 | 41.77 | 15.24 | |
| K-White TC720[11] | | | | 4.56 | | 4.56 | 4.57 | |
| AZO77H[12] | | | | | | | 29.13 | 9.17 |
| Zinc Dust 64[13] | | | | | | | | 183.39 |
| Weight Totals | 103.79 | 126.82 | 145.25 | 151.88 | 145.25 | 151.88 | 152.44 | 305.65 |

| Component | Primer Examples | | | | | | | | |
|---|---|---|---|---|---|---|---|---|---|
| | 9 | 10 | 11 | 12 | 13 | Comp 14 | Comp 15 | Comp 16 | 17 |
| Bisphenol A Epoxy Resin A[1A] | 55.16 | 55.16 | 53.05 | | | 43.67 | 43.67 | | 55.10 |
| Bisphenol A Epoxy Resin B[1A] | | | | | 69.35 | | | 29.13 | |
| Bisphenol A Epoxy Resin C[1A] | 16.30 | 16.30 | | 73.44 | | | | | 16.33 |
| Bisphenol A Epoxy Resin D[1A] (Contains Acronal 4F Flow Modifier) | 12.24 | 12.24 | 12.24 | 12.24 | 12.24 | 12.08 | 12.08 | 12.08 | 12.24 |
| Bisphenol A Epoxy Resin H[1B] (Novolac Modifed) | | | 16.30 | | | | | | |
| Carboxyl Polyester Resin B[2B] | | | | | | 44.25 | 44.25 | 58.79 | |
| Phenolic Curing Agent[3] (Contains 2-Methylimidazole) | 16.30 | 16.30 | 18.41 | 14.32 | 18.41 | | | | 16.33 |
| Tetrabutylammonium Bromide | | | | | | 0.20 | 0.20 | 0.20 | |
| Benzoin[6] | 0.53 | 0.53 | 0.53 | 0.53 | 0.53 | 0.53 | 0.53 | 0.53 | 0.52 |
| Black Pearls 800[7] | 0.46 | 0.46 | 0.46 | 0.46 | 0.46 | 0.46 | 0.46 | | 0.45 |
| Tiona 595t[8] | 4.56 | 4.56 | 4.56 | 4.56 | 4.56 | 4.56 | 4.56 | 7.64 | 4.45 |
| Irganox 1076[16] | | | | | | | | | 0.45 |
| Muscovite Mica Filler[9] | | | 26.58 | 26.58 | 26.58 | | 26.58 | | 24.12 |
| Calcium Metasilicate (Wollastonite) Filler[10] | 15.19 | 15.19 | 15.19 | 15.19 | 15.19 | 41.77 | 15.19 | | 14.84 |
| Glass Flake (Modified C Type)[14] | 26.58 | | | | | | | | |
| Magnesium Silicate (Talc) Filler[15] | | 26.58 | | | | | | | |
| K-White TC720[11] | 4.56 | 4.56 | 4.56 | 4.56 | 4.56 | 4.56 | 4.56 | | 3.60 |
| Zinc Dust 64[13] | | | | | | | | 183.39 | |
| Weight Totals | 151.88 | 151.88 | 151.88 | 151.88 | 151.88 | 152.08 | 152.08 | 291.76 | 148.43 |

[1A]Bisphenol A epoxy resins A, B, C and D have EEW of 860-930, 730-820, 1250-1400, and 780-900 respectively and are commercially available from The Dow Chemical Company.
[1B]Bisphenol A epoxy resin H is novolac modified having an EEW of 750-850 and is commercially available from The Dow Chemical Company.
[2A]Carboxyl functional polyester resin with acid number of 46-51 mg KOH/g and Tg of ~50° C. commercially available from Cytec Industries Inc.
[2B]Carboxyl functional polyester resin with acid number of 68-74 mg KOH/g and Tg of ~58° C. commercially available from Cytec Industries Inc.
[3]Phenolic curing agent with HEW of 240-270 and containing 2% of a 2-Methylimidazole cure accelerator commercially available from The Dow Chemical Company.
[4]Casamid 710 is a substituted dicyandiamine curing agent commercially available from the Thomas Swan & Co., Ltd.
[5]Epikure P-108 is an accelerated dicyandiamine commercially available from Hexion Speciality Chemicals.

-continued

[6]Benzoin is a degassing agent commercially available from Aceto Corporation.
[7]Black Pearls 800 is a carbon black pigment commercially available from Cabot Corporation.
[8]Tiona 595 is a titanium dioxide pigment commercially available form Millennium Chemicals.
[9]Muscovite mica filler with average median particle size of 20 um commercially available from Fibertec, Inc.
[10]Calcium metasilicate (wollastonite) filler with 3.5 um median particle size and aspect ratio of 3 commercially available NYCO Minerals.
[11]K-White TC720 is a magnesium silicate (talc) anti-corrosive pigment commercially available from the Tayca Corporation.
[12]AZO77H is a zinc oxide pigment commercially available from U.S. Zinc.
[13]Zinc dust 64 is zinc powder manufactured by Zinc Corporation of America and distributed through The Cary Company.
[14]Modified C composition glass flake with nominal thickness of 1.3-2.3 um and 65% between 50-300 um in length commercially available Glass Flake, Ltd.
[15]Magnesium silicate (talc) filler with 13 um median particle size and top-end particle size of 45 um commercially available from Rio Tinto Minerals.
[16]Irganox 1076 is a phenolic antioxidant commercially available from BASF.

Topcoat Compositions

| Component | Topcoat Examples | | | | | | | | |
|---|---|---|---|---|---|---|---|---|---|
| | Comp 1 | Comp 2 | Comp 3 | Comp 4 | Comp 5 | 6 | 7 | 8 | 9 |
| Bisphenol A Epoxy Resin E[1] | 50.00 | 40.00 | | | | | | | |
| Bisphenol A Epoxy Resin F[1] | | | 45.00 | | | | | | |
| Bisphenol A Epoxy Resin G[1] | | | | 30.00 | 30.00 | 30.00 | 30.00 | 30.00 | |
| Bisphenol A Epoxy Resin H[12] | | | | | | | | | 17.86 |
| Bisphenol A Epoxy Resin I[12] | | | | | | | | | 62.50 |
| CTBN Modified Bisphenol A Epoxy Resin A[2] | | | 10.00 | 10.00 | 10.00 | 10.00 | 10.00 | | |
| CTBN Modified Bisphenol A Epoxy Resin B[13] | | | | | | | | | 10.71 |
| Carboxyl Polyester Resin A[3] | 50.00 | | | | | | | | |
| Carboxyl Polyester Resin B[4] | | 60.00 | 55.00 | 60.00 | 60.00 | 60.00 | 60.00 | 60.00 | |
| Phenolic Curing Agent[14] | | | | | | | | | 8.93 |
| 2-methylimidazole | | | | | | | | | 0.27 |
| Substituted Dicyandiamide[15] | | | | | | | | | 0.54 |
| Benzoin | | | | | | | | | 0.54 |
| Polytetrafluoroethylene | | | | | | | | | 2.68 |
| Polyethylene Wax | | | | | | | | | 0.89 |
| Hindered Amine Tinuvin 144[16] | | | | | | | | | 0.54 |
| Flow Agent PE-200[17] | | | | | | | | | 0.89 |
| Carbon Black Pigment | | | | | | | | | 1.43 |
| Benzyltriethylammonium chloride | 0.25 | 0.34 | 0.34 | 0.29 | 0.32 | 0.34 | 0.34 | 0.34 | |
| Bentone 38[5] | 0.69 | 0.69 | 0.69 | 0.69 | 0.75 | 0.81 | 0.81 | 0.81 | |
| Lanco TF1778[6] | 1.10 | 1.11 | 1.11 | 1.11 | 1.20 | 1.30 | 1.30 | 1.30 | |
| p,p'-oxybis(benzenesulfonylhydrazide) Foaming Agent[7] | | | | | 1.13 | 1.22 | 1.22 | | |
| Azodicarbonamide Foaming Agent[8] | | | | | | | | 1.05 | |
| p-toluenesulfonyl hydrazine Forming Agent[22] | | | | | | | | | 1.07 |
| Black Pearls 800 | 1.38 | 1.38 | 1.38 | 1.38 | 1.50 | 1.62 | 1.62 | 1.62 | |
| Calcium Metasilicate (Wollastonite) Fibers[9] | | | | | | 48.66 | | 48.58 | |
| Aluminosilicate Fibers[10] | | | | | | | 48.66 | | |
| E-Glass Fibers[18] | | | | | | | | | 35.71 |
| Nepheline Syenite[19] | | | | | | | | | 8.93 |
| Barium Sulfate[20] | | | | | | | | | 15.95 |
| Calcium Carbonate[21] | | | | | | | | | 8.93 |
| Atomitell | 34.51 | 34.56 | 34.56 | 34.53 | 45.00 | 8.11 | 8.11 | 8.10 | |
| Weight Totals | 138.03 | 138.22 | 138.22 | 138.12 | 150.03 | 162.21 | 162.21 | 161.95 | 178.37 |
| Theoretical Coating Density(g/cm$^3$) | N/A | N/A | N/A | N/A | 1.45 | 1.53 | 1.50 | 1.52 | N/A |
| Porous Coating Density(g/cm$^3$) | N/A | N/A | N/A | N/A | 0.98 | 1.10 | 0.95 | 0.92 | N/A |
| % Density Reduction | N/A | N/A | N/A | N/A | 32.40 | 28.10 | 36.7 | 39.5 | N/A |

[1]Bisphenol A epoxy resins E, F and G have an EEW of 730-820, 860-930, and 520-560 respectively and are commercially available from The Dow Chemical Company.
[2]CTBN modified epoxy resin with an EEW of 1250-1500 commercially available from CVC Specialty Chemicals, Inc.
[3]Carboxyl functional polyester resin with an acid number of 46-51 mg KOH/g and Tg of ~50° C. commercially available from Cytec Industries Inc.
[4]Carboxyl functional polyester resin with an acid number of 68-74 mg KOH/g and Tg of ~58° C. commercially available from Cytec Industries Inc.
[5]Bentone 38 is an organoclay rheological modifier commercially available from Elementis Specialties.
[6]Lanco TF1778 is a polyethylene/PTFE based wax commercially available from Lubrizol Advanced Materials, Inc.
[7]The p,p'-oxybis(benzenesulfonylhydrazide) foaming agent has a decomposition point of 320° F. with a gas yield of 125 cc/g and is commercially available through Chemtura Corporation.
[8]The azodicarbonamide foaming agent has decomposition point of 329-356° C. with a gas yield of 180 cc/g and is commercially available through Chemtura Corporation.
[9]The calcium metasilicate (wollastonite) fibers have an average particle size of 3 um with an aspect ratio of 9 and are commercially available through Fibertec, Inc.
[10]The aluminosilicate fibers are silane treated and have an average length of 125 ± 25 um and are commercially available form Lapinus Fibers.
[11]Atomite is a calcium carbonate filler commercially available from Imerys Performance Minerals.
[12]Bisphenol A epoxy resins H and I have an EEW of 730-840 and 1150-1300 respectively and are commercially available from The Kukdo Chemical Company.

-continued

|  | Topcoat Examples | | | | | | | | |
|---|---|---|---|---|---|---|---|---|---|
| Component | Comp 1 | Comp 2 | Comp 3 | Comp 4 | Comp 5 | 6 | 7 | 8 | 9 |

[13] CTBM modified epoxy resin with an EEW 1100-1300 commercially available from The Kukdo Chemical Company.
[14] Phenolic curing agent with a HEW of 230-260 commercially available from The Kukdo Chemical Company.
[15] Casamid 710 substituted dicyandiamide commercially available from Thomas Swan & Co., Ltd.
[16] Commercially available from BASF.
[17] Commercially available from Estron.
[18] Silane treated glass fibers with a diameter of 16 microns and a length of 150 microns, commercially available from Fibertec.
[19] Nepheline Syenite with an average particle size of 2.1 microns, commercially available from Unimin.
[20] Barium sulfate with an average particle size 1.2-1.5 microns.
[21] Calcium carbonate with an average particle size 1.7 microns, commercially available from Omya.
[22] p-toluenesulfonyl hydrazine foaming agent with a decomposition point of 145° C., commercially available from Dongjin Semichem.

Primer Examples Test Data & Comparatives

|  | 30 Cycles SAE J2334 Cyclic Corrosion (Creep) | | | SAE J400 Chip Resistance |
|---|---|---|---|---|
| Primer Example | Min. (mm) | Max. (mm) | Avg. (mm) | Method B - (Rating) |
| Comp. 1 (non-zinc) | 4 | 6 | 5.3 | 8A |
| 2 (non-zinc) | 1 | 3 | 2.4 | 8A |
| 3 (non-zinc) | 0 | 2 | 1.3 | 8A |
| 4 (non-zinc) | 0 | 1 | 0.4 | 8A |
| 5 (non-zinc) | 1 | 3 | 1.9 | 8A |
| Comp. 6 (non-zinc) | 2 | 5 | 3.9 | 8B |
| Comp. 7 (zinc) | 2 | 4 | 3.2 | 7B |
| Comp. 8 (zinc) | 0 | 2 | 1.4 | 9B |
| Comp. 14 (non-zinc) | 3 | 7 | 5.4 | 8A |
| Comp. 15 (non-zinc) | 2 | 6 | 2.3 | 8B |
| Comp. 16 (zinc) | 1 | 4 | 2.1 | 8B |

Topcoat Examples Test Data (with Primer Example 4)

*Testing to Ford specification WSS-M2P177-B1 for high tensile suspension springs which allows no chipping of coating to metal on SAE J400. The chip rating must be a 10.

| Topcoat | SAE J400 Chip Resistance - Method B | | |
|---|---|---|---|
| Example | Rating | Failure Point | Pass/Fail |
| Comp. 1 | 8C | Substrate to Primer | Fail |
| Comp. 2 | 8B | Substrate to Primer | Fail |
| Comp. 3 | 8B | Substrate to Primer | Fail |
| Comp. 4 | 8A-8B | Substrate to Primer | Fail |
| Comp. 5 | 8A | Substrate to Primer | Fail |
| 6 | 10 | N/A | Pass |
| 7 | 10 | N/A | Pass |
| 8 | 10 | N/A | Pass |

Substrate: Zinc phosphate pretreated steel panels formed to simulate suspension springs
Primer: Example 4 (2.5-3.0 mils)
Dual-coat Film Thickness: 15.0-20.0 mils
GM Cyclic Corrosion (GMW14782) & GM Impact Resistance (GMW14700)
Test Procedure: GMW14782 (Method B)
Evaluation Procedure: GM 15282 (Method A)
Requirements: 6 mm maximum average creepback and no chipping greater than 3 mm

| Primer Example (with Topcoat 6) | Impact Resistance GMW 14700 | GMW14782 (Method B) Maximum Avg. Creekback (mm) | Pass/Fail |
|---|---|---|---|
| Comp. 1 | No Chipping | Total Adhesion Loss | Fail |
| 2 | No Chipping | 4.6 | Pass |
| 3 | No Chipping | 2.4 | Pass |
| 4 | No Chipping | 1.6 | Pass |
| 5 | No Chipping | 3.9 | Pass |
| 9 | No Chipping | 2.7 | Pass |
| 10 | No Chipping | 2.4 | Pass |
| 11 | No Chipping | 2.6 | Pass |
| 12 | No Chipping | 2.3 | Pass |
| 13 | No Chipping | 2.6 | Pass |

Topcoat Examples and Test Data (with Primer Example 17)
Test Procedure: GM9984164 specification for dual coat springs.
Substrate: Zinc phosphate pretreated panels formed to simulate suspension springs
Primer: Example 17
Topcoat: Example 9
Dual Coat Film Thickness: 17-23 mils

| Salt Spray ASTM B-117 | | | | | |
|---|---|---|---|---|---|
| Hours | GM Requirement | Scribe Creep | Blistering | Rusting | Pass/Fail |
| 1000 | No blistering or face rust | 0 | None | None | Pass |
| 2000 | Not a GM requirement | 0 | None | None | Pass |
| 3000 | Not a GM requirement | 0 | None | None | Pass |

Test Procedure: GM9984164 specification for dual coat springs.
Substrate: Zinc phosphate pretreated panels formed to simulate suspension springs
Primer: Example 17
Topcoat: Example 9
Dual Coat Film Thickness: 14-16 mils

| Duration | Result | Pass/Fail |
|---|---|---|
| 5 cycles (10 weeks) | No visible stress cracking, corrosion, loss of adhesion or objectionable changes in appearance | Pass |

I claim:
1. A steel alloy coated by a composition comprising an epoxy thermoset primer comprising:

a corrosion resistant primer formed from an epoxy thermoset primer composition comprising:
   an epoxy resin with the proviso that the epoxy resin does not have an EEW of 860 to 930;
   a polyhydroxyl functional phenolic curing agent having a HEW of 200 to 500; and
   a platy filler;
wherein the epoxy thermoset primer is substantially zinc-free; and
a topcoat,
the topcoat comprising
   an epoxy thermoset topcoat composition that includes:
   an epoxy resin having an EEW of 450 to 1400;
   an elastomer-modified epoxy resin having an EEW of 1000 to 1600; and
   a foaming agent that is p,p'-oxybis(benzenesulfonylhydrazide), activated azodicarbonamide based compositions, or a p-toluenesulfonylhydrazide based foaming agents, and
a reinforcing fiber;
wherein the epoxy resin in the epoxy resin thermoset topcoat composition is a bisphenol A epoxy resin present in an amount from 10 to 85 parts per hundred resin.

2. The steel alloy of claim 1, wherein the epoxy topcoat further comprises a carboxyl functional polyester resin with an acid number of 25 to 85 mg KOH/g.

3. The steel alloy of claim 1, wherein the epoxy resin of the epoxy thermoset primer composition has an EEW of 730 to 1400, with proviso that the epoxy resin of the epoxy thermoset primer composition does not have an EEW of 860 to 930 or wherein the epoxy resin of the epoxy thermoset primer composition has an EEW of between 780 and 900 with the proviso that the epoxy resin of the epoxy thermoset primer composition does not have an EEW of between 860 and 930.

4. The steel alloy of claim 1, wherein the epoxy resin of the epoxy thermoset primer composition has an EEW of 730 to 820, an EEW of between 1250 and 1400, or an EEW of between 750 and 850.

5. The steel alloy of claim 1, wherein the curing agent further comprises a 2-methylimidazole cure accelerator.

6. The steel alloy of claim 1, wherein the platy filler comprises complex aluminosilicate (mica), magnesium silicate (talc), or a combination thereof.

7. The steel alloy of claim 6, wherein the platy filler includes complex aluminosilicate (mica) present in an amount from 10 to 40 phr and has a median particle size of from 10 to 35 microns.

8. The steel alloy of claim 6, wherein the platy filler further includes glass flakes having a nominal thickness of 1.3-2.3 microns.

9. The steel alloy of claim 6, wherein the platy filler includes magnesium silicate (talc) present in an amount of from 10 to 40 phr and with a median particle size of from 10 to 35 um.

10. The steel alloy of claim 1, wherein the elastomer-modified epoxy resin comprises a bisphenol A epoxy resin present in an amount from 5 to 35 pans per hundred resin.

11. The steel alloy of claim 1, wherein the epoxy thermoset primer contains zero zinc.

12. The steel alloy of claim 1, wherein the reinforcing fiber comprises aluminosilicate, calcium metasilicate (wollastonite), aramid, carbon, or a combination thereof.

* * * * *